United States Patent
Codolar et al.

(10) Patent No.: US 10,214,818 B2
(45) Date of Patent: Feb. 26, 2019

(54) ANTI-CORROSIVE ZINC PRIMER COATING COMPOSITIONS COMPRISING HOLLOW GLASS SPHERES AND A CONDUCTIVE PIGMENT

(71) Applicant: Hempel A/S, Kgs. Lyngby (DK)

(72) Inventors: Santiago Arias Codolar, Barcelona (ES); Salvador Colominas Tutusaus, Polinyá (ES); Tomás Alhambra Redondo, Polinyá (ES); Rubèn Palomo Ribell, Sitges (ES)

(73) Assignee: HEMPEL A/S, Kgs. Lyngby (DK)

( * ) Notice: Subject to any disclaimer, the term of this patent is extended or adjusted under 35 U.S.C. 154(b) by 0 days.

(21) Appl. No.: 14/421,725

(22) PCT Filed: Aug. 29, 2013

(86) PCT No.: PCT/EP2013/067952
§ 371 (c)(1),
(2) Date: Feb. 13, 2015

(87) PCT Pub. No.: WO2014/033237
PCT Pub. Date: Mar. 6, 2014

(65) Prior Publication Data
US 2015/0210863 A1   Jul. 30, 2015

(30) Foreign Application Priority Data

Aug. 29, 2012   (EP) .................... 12182173

(51) Int. Cl.
| | | |
|---|---|---|
| *C09D 5/10* | (2006.01) | |
| *C23F 13/14* | (2006.01) | |
| *C09D 5/24* | (2006.01) | |
| *C08K 7/28* | (2006.01) | |
| *B65D 81/32* | (2006.01) | |
| *C08K 3/04* | (2006.01) | |
| *C09D 5/08* | (2006.01) | |
| *C09D 7/40* | (2018.01) | |
| *C08K 3/08* | (2006.01) | |

(52) U.S. Cl.
CPC .............. *C23F 13/14* (2013.01); *B65D 81/32* (2013.01); *C08K 3/04* (2013.01); *C08K 7/28* (2013.01); *C09D 5/084* (2013.01); *C09D 5/106* (2013.01); *C09D 5/24* (2013.01); *C09D 7/70* (2018.01); *C08K 3/08* (2013.01); *C08K 2003/0893* (2013.01); *Y10T 428/249974* (2015.04)

(58) Field of Classification Search
CPC .......... C23F 13/14; C09D 7/70; C09D 5/084; C09D 5/106; C09D 5/24; B65D 81/32; C08K 3/04; C08K 7/28; C08K 3/08; C08K 2003/0893; Y10T 428/249974
See application file for complete search history.

(56) References Cited

U.S. PATENT DOCUMENTS

| | | | |
|---|---|---|---|
| 3,620,784 A | 1/1971 | Schutt | |
| 4,621,024 A | 11/1986 | Wright | |
| 5,413,628 A | 5/1995 | Savin | |
| 5,580,907 A | 12/1996 | Savin | |
| 5,677,367 A * | 10/1997 | Savin | ..................... C09D 5/106 523/219 |
| 5,792,803 A | 8/1998 | Savin | |
| 6,287,372 B1 | 9/2001 | Briand et al. | |
| 6,468,336 B1 | 10/2002 | Fiedler et al. | |
| 2002/0168477 A1* | 11/2002 | Savin | ....................... B22F 3/24 427/397.8 |

FOREIGN PATENT DOCUMENTS

| | | | | |
|---|---|---|---|---|
| CN | 1840586 A | 10/2006 | | |
| CN | 102002318 A | 4/2011 | | |
| EP | 0 722 993 A1 | 7/1996 | | |
| RU | 2 148 603 C1 | 5/2000 | | |
| RU | 2 295 552 C1 | 3/2007 | | |
| WO | WO-1996-005257 | * | 2/1996 | ............... C09D 5/10 |
| WO | WO 96/16109 A1 | 5/1996 | | |
| WO | WO 96/29372 A1 | 9/1996 | | |
| WO | WO 99/58274 A1 | 11/1999 | | |
| WO | WO 00/64344 A1 | 11/2000 | | |
| WO | WO 01/51575 A1 | 7/2001 | | |

OTHER PUBLICATIONS

Potters "Engineered Glass Amterials Division Hollow Microsperes", url: http://www.pottersbeads.com/LinkClick.aspx?fileticket=VkPoZxJK-pl%3D&tabid=349&mid=1023, internet retrieval date Jan. 23, 2017.*
International Search Report for PCT/EP2013/067952 dated Oct. 10, 2013.

* cited by examiner

*Primary Examiner* — Jonathan C Langman
(74) *Attorney, Agent, or Firm* — Birch, Stewart, Kolasch & Birch, LLP

(57) ABSTRACT

The present invention concerns anti-corrosive coating compositions, in particular coating compositions for protecting iron and steel structures. In particular, the present invention relates to silicate-based coating compositions comprising particulate zinc, conductive pigments, and glass hollow microspheres. The invention furthermore concerns a kit of parts containing the composition, a method for its application, as well as metal structures coated with the composition.

13 Claims, No Drawings

ANTI-CORROSIVE ZINC PRIMER COATING COMPOSITIONS COMPRISING HOLLOW GLASS SPHERES AND A CONDUCTIVE PIGMENT

CROSS REFERENCE TO RELATED APPLICATIONS

This application is a U.S. National Phase Application of PCT International Application Number PCT/EP2013/067952, filed on Aug. 29, 2013, designating the United States of America and published in the English language, which is an International Application of and claims the benefit of priority to European Patent Application No. 12182173.0, filed on Aug. 29, 2012. The disclosures of the above-referenced applications are hereby expressly incorporated by reference in their entireties.

FIELD OF THE INVENTION

The present invention resides in the field of anti-corrosive coating compositions, in particular coating compositions for protecting iron and steel structures. In particular, the present invention relates to silicate-based coating compositions comprising particulate zinc, conductive pigments, and hollow glass microspheres.

BACKGROUND OF THE INVENTION

Zinc primers, both organic and in-organic coatings, are extensively used in the marine and offshore industry and may also be specified for e.g. bridges, containers, refineries, petrochemical industry, power-plants, storage tanks, cranes, windmills and steel structures part of civil structures e.g. airports, stadia, tall buildings. Such coatings may be based on a number of binder systems, such as binder systems based on silicates, epoxy, polyurethanes, cyclized rubbers, phenoxy resin, epoxy ester, urethane alkyd etc.

In zinc primers, zinc is used as a conductive pigment to produce an anodically active coating. Zinc acts as sacrificial anodic material and protects the steel substrate, which becomes the cathode. The resistance to corrosion is dependent on the transfer of galvanic current by the zinc primer but as long as the conductivity in the system is preserved and as long there is sufficient zinc to act as anode the steel will be protected galvanically. Therefore, zinc pigment particles in zinc primers are packed closely together and zinc primers are typically formulated with very high loadings of zinc powder.

Various approaches have been used in order to reduce the zinc loadings in the art. U.S. Pat. No. 4,621,024 discloses coating microspheres with a metal substrate, such as zinc, resulting in an overall reduction in the metal component of the coating. U.S. Pat. No. 6,287,372 discloses further efforts to reduce the amount of zinc dust in the compositions by incorporation of ceramic microspheres. It is further disclosed that the incorporation of ceramic microspheres facilitates thicker coatings without mud cracking.

WO 96/29372 discloses dry coating compositions for dissolving in a solvent in situ, said dry coating compositions containing graphite to avoid hard settling of the coating compositions.

There is, however, still a need for improved corrosion resistance of steel-based metal structures, which is cost-effective and limits the amount of zinc applied to the protective coatings. High dry film thicknesses in zinc silicate coatings are usually a cause of failure of the paint system due to mud cracking. These high thicknesses are particularly difficult to avoid in overlapping areas, such as welding seams, corners, etc. Hence, there is also still a need for zinc silicate protective coatings allowing for thicker layers of coating without mud cracking.

In order to establish sufficient corrosion protection and ensure optimum performance of the coating, it is necessary to specify the requirements for the protection paint system along with the relevant laboratory performance tests to assess its likely durability. The use of new technologies and paint formulations also means coatings being developed with little or no previous track record. This has resulted in more emphasis being placed on accelerated laboratory testing to evaluate coating performance. Many of these accelerated exposure tests will not, within their exposure time show the negative effects visually on intact coated surfaces. Therefore behaviour of the coatings around artificially made damages, e.g. scores, are given significant considerations and many prequalification tests are based amongst others on rust creep and blistering as well as detachment from scores, ISO 12944, NORSOK M-501, ISO 20340, NACE TM 0104, 0204, 0304, 0404, etc. (Weinell, C. E. and S. N. Rasmussen, Advancement in zinc rich epoxy primers for corrosion protection, NACE International, paper no. 07007 (2007)). These accelerated weathering methods seek to intensify the effects from the environment so that the film breakdown occurs more rapidly (Mitchell, M. J., Progress in offshore coatings, NACE International, paper no. 04001 (2004)). The lower the rust creep the better overall anticorrosive performance.

SUMMARY OF THE INVENTION

The object of the invention is achieved with a coating composition comprising:
 a) a silicate-based binder system,
 b) zinc particles,
 c) hollow glass microspheres, and
 d) a conductive pigment selected from the group consisting of graphite, carbon black, aluminium pigments, black iron oxide, antimony-doped tin oxide, mica coated with antimony-doped tin oxide, carbon nanotubes, carbon fibres, and any mixture thereof.

In one embodiment, the coating composition according to the present invention contains a conductive pigment selected from carbon black, graphite, and any mixture thereof.

DETAILED DESCRIPTION OF THE INVENTION

Zinc Silicate-Based Coatings

Zinc silicate coatings are used mainly as anti-corrosive primers on steel substrates due to outstanding corrosion resistance, superior mechanical properties, very high temperature resistance and excellent chemical resistance.

Zinc silicates are superior to other linings concerning anticorrosive properties due to its function as a sacrificial anode applied directly on top of the clean steel surface. When the coating layer is damaged, the zinc will protect the damage by galvanic protection. The function is similar to that of galvanized steel.

Zinc silicate-based coatings are normally used as primers, i.e. first coating layer in a multiple coat system with subsequent layers of suitable generic types of coatings, e.g. epoxy or epoxy+polyurethane. However, zinc silicate coatings can also be used as one-coat systems.

Zinc silicate coatings are typically one or two component systems. These coatings typically do not require the addition of a curing agent. In two component systems the zinc particles are stored separately from the rest of the coating components. Zinc silicate coatings may also be three component systems, wherein the accelerator and zinc particles are usually stored separately from the rest of the components.

Zinc silicate coatings may be applied with standard spraying equipment. However, spraying a silicate paint composition is a little different from conventional paints. Normally, paints have a tendency to build up in corners on welding seams and in difficult accessible areas, a problem which is even more pronounced when the silicate paint composition contains zinc. These products are formulated with PVC above the CPVC ratio to ensure sufficient contact between the zinc particles for galvanic protection. Silicate coatings with zinc will therefore have a higher risk for mud cracking if they are applied in too high film thickness. Consequently, extra efforts and man hours are often spent here in order not to end up with too high dry film thicknesses.

Silicate coatings contain silicate resins and may be either solvent-based or water-based. Accordingly, in one embodiment, the silicate-based binder system is solvent-based. In another embodiment, the silicate-based binder system is water-based. The amount of silicate resin in the coating may vary. In one embodiment, the amount of silicate resin is from about 2 to 20% by solids volume, such as from about 4 to about 18% by solids volume, e.g. from about 5 to 15% by solids volume, in particular from about to 10% by solids volume of the coating composition.

Solvent-Based Zinc Silicate Coatings

Typical zinc silicate coatings for corrosion protection are solvent-based silicate coatings, such as alkyl silicate coatings. Hence, in one embodiment, the silicate-based binder system is a solvent-based silicate-based binder system. In a further embodiment, the silicate-based binder system is an alkyl silicate binder system.

The term "alkyl silicate binder system" should be construed as the combination of—as the principal constituents—one or more alkyl silicate resins, any catalysts and any accelerators and any solvent(s). The compositions may further include other constituents as it will be explained further below. Suitable alkyl silicate resins include ethyl silicates although other alkyl silicates wherein the alkyl groups contains from 1 to 8 carbon atoms, such as methyl silicates, propyl silicates, butyl silicates, hexyl silicates and octyl silicates can also be employed, either alone or in admixture. The alkyl silicate resins used can suitably be hydrolysed to various degrees. The amount of alkyl silicate resin in the coating may vary. In one embodiment, the amount of alkyl silicate resin is from about 2 to 20% by solids volume, such as from about 4 to about 18% by solids volume, e.g. from about 5 to 15% by solids volume, in particular from about to 10% by solids volume of the coating composition.

In alkyl silicate binder systems the silicate is partially hydrolysed by means of water and by utilizing an acid (e.g. hydrochloric acid or sulphuric acid) or base as a catalyst. Acid catalysis generally proceeds in a somewhat slower and more controlled fashion compared to partial hydrolysis by using a base as the catalyst. In addition, the presence of acids tends to stabilize reactive silanol (Si—OH) groups and increase storage stability.

Besides the fact that the zinc alkyl silicate coating compositions of the present invention should preferably facilitate fast curing, it is also relevant that the zinc alkyl silicate coating compositions are somewhat flexible upon application.

Examples of suitable commercially available solvent based alkyl silicate resins for preparing alkyl silicate-based binder systems and zinc alkyl silicate coating compositions are:
Dynasylan 40, ex. Evonik, ethyl silicate
Silikat TES 40 WN, ex. Wacker Chemie (Germany), ethyl silicate
Silbond 40, ex. Silbond Corporation (USA), ethyl silicate
Silikat TES 28, ex. Wacker Chemie (Germany), ethyl silicate
Ethyl silicate 40, Nantong Chengang Chemical Factory (China)
ES-40, DKIC (India)

Ethyl silicate has been the dominant alkyl silicate resin for more than 30 years. Other alkyl types have been used, such as isopropyl and butyl from which the corresponding alcohol is evolved on hydrolysis, but ethyl, despite of the low flash point of 10° C. of ethanol, is the principal type used. Hence, in one embodiment, the silicate-based binder system comprises an ethyl silicate resin.

Ethanol is completely miscible with water, ideal for hydrolysis and has low toxicity (G. J. Biddle, Inorganic zinc silicate coatings). Moreover, curing speed is faster than with higher alcohols. The starting point for ethyl silicate (relevant illustrative example of an alkyl silicate) is tetra ethyl ortho silicate (TEOS), a monomeric product with a composition of $(C_2H_5O)_4Si$. The raw material normally used by paint manufacturers is a polyethyl silicate containing about 40% silica. Normal procedure is to partially hydrolyse the polyethyl silicate during production by addition of water and a small amount of catalyst, e.g. hydrochloric acid to speed up the curing of the coating after application. Upon partial hydrolysis, some of the ethoxy groups in the ethyl ortho silicate are replaced by hydroxyl groups, thereby liberating ethanol. Some of the hydroxyl groups react with each other, giving off water and tying silicon atoms together by oxygen bridges. The amounts of water and catalyst are carefully calculated and controlled to optimise the balance between shelf life, mixed pot life, curing and cracking level.

Preferably, the degree of pre-hydrolysis of the alkyl silicate resin is more than 50%, such as 60-95%, e.g. 75-90%.

Co-binders such as cellulose and polyvinyl butyral (PVB) may be added.

When an alkyl silicate composition is mixed with zinc, the resulting paint composition becomes pH-neutral. The condensation reaction will become active and the alkyl resin silicate will begin to polymerize. After application, humidity in the air completes the polymerisation.

A common way to reduce the curing time is to add an accelerator such as zinc chloride or magnesium chloride. Other possible accelerators are dibutyltin laurate and dioctyltin laurate. The maximum amount of zinc chloride that can be added is limited as the fast curing has a negative impact on the cracking level (internal stress). By adding hollow glass microspheres and a conductive pigment selected from the group consisting of graphite, carbon black, aluminium pigments, black iron oxide, antimony-doped tin oxide, mica coated with antimony-doped tin oxide, carbon nanotubes, carbon fibres, and any mixture thereof to the alkyl silicate resin, the negative impact on the cracking level can be diminished and it is possible to add higher amounts of accelerator thereby reducing the curing time even further than previously possible.

The alkyl silicate-based binder system typically comprises one or more catalysts. Suitable catalysts are believed to include hydrochloric acid and sulphuric acid. The silicate-based binder system may further comprise one or more accelerators selected from zinc chloride, magnesium chloride or borate types like trimethylborate.

Examples of suitable commercially available accelerators are:
Zinc Chloride, ex. Barcelonesa de Droguas y Producto Químicos (Spain), anhydrous zinc chloride
Magnesium chloride (CAS no. 7786-30-3), ex Merck (Germany), anhydrous magnesium chloride
Silbond TMB 70, ex. Silbond Corporation (US), trimethylborate.

The solvent-based zinc silicate coating composition of the invention may comprise other paint constituents as will be apparent for the person skilled in the art. Examples of such paint constituents are non-conductive pigments e.g. $TiO_2$, yellow or red iron oxides, cobalt blue, bismuth vanadates and organic pigments; fillers, e.g. Al/K/Na silicates (e.g. Silicato MN/SA 15 12/2009. Minerals I Derivats S.A., Spain) or kaolin (e.g. Polwhite E, Imerys Performance Minerals), talc, mica, and $BaSO_4$; additives (e.g. wetting agents, dispersing agents, scavengers, rheologic agents, thickening agents, de-foaming agents, and thixotropic agents (such as bentonites)).

In the paint composition, the total amount of fillers and non-conductive pigments may be in the range of 0-50%, such as 0-40%, 0-30% or 0-25% by solids volume of the mixed paint composition. In the alternative, the total amount of fillers and non-conductive pigments may be in the range 5-40% by solids volume, such as in the range 10-35% by solids volume.

In the paint composition, the total amount of additives may be in the range of 0-10%, such as 0.1-8% by solids volume of the mixed paint composition.

In one embodiment, the coating composition of the invention contains less than 10% by weight of the filler modified $CaSiO_3$, also known as "Wollastonite".

The paint composition typically comprises a solvent or solvents. Examples of solvents are water; alcohols, such as methanol, ethanol, propanol, isopropanol, butanol, isobutanol or benzyl alcohol; alcohol/water mixtures, such as ethanol/water mixtures; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclohexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

Depending on the application technique, it is desirable that the paint comprises solvent(s) so that the solids volume ratio (SVR—ratio between the volume of solid constituents to the total volume) is in the range of 25-100%, such as 30-80%, in particular 35-70% e.g. 40-60%.

SVR is determined according to ISO 3233 or ASTM D 2697 with the modification that drying is carried out at 20° C. and 60% relative humidity for 7 days instead of drying at higher temperatures.

Water-Based Zinc Silicate Coatings

In addition to solvent-based zinc silicate coatings, said silicate coatings may also be water-based, comprising a water-based silicate-based binder system. In one embodiment, the water-based silicate-based binder system comprises one or more water-soluble silicates, such as alkali metal silicates. Examples of water-soluble silicates are alkali metal silicates, such as lithium silicate, sodium silicate, or potassium silicate, and ammonium silicates, such as tetraethanol ammonium silicate, or diethanol morpholinium silicate. In one embodiment, the alkali metal silicate is lithium silicate, sodium silicate, or potassium silicate, among which lithium silicate and potassium silicate are the most preferred.

Examples of suitable commercially available water-based alkali silicate resins are:
Kali Wasserglass 28/30, BASF
Ludox lithium Polysilicate, ex. Grace Division (US)
Ludox HS40, ex. Grace Division (US)

The paint composition may comprise fillers, accelerators and/or additives as will be apparent for the person skilled in the art.

Examples of such fillers other than the conductive pigments as claimed herein, (which in principle may be a single filler or a combination of two or more fillers) are e.g. red or yellow iron oxides, natural and precipitated barium sulphate, barytes, blanc fixe; aluminium silicate, kaolin, kaolinite, china clay; magnesium silicate and magnesium hydrosilicate, mica, talc, micaceous iron oxide, chlorite, tremolite; silica, surface treated silica, amorphous quartz, crystalline quartz, fumed silica; aluminium oxide, bauxite, calcined bauxite; calcium magnesium carbonate, dolomite; natural and precipitated calcium carbonate; aluminium silicates, potassium/aluminium silicates, feldspar; nepheline syenite; calcium silicates, wollastonite; zinc oxide; zinc phosphate; bismuth vanadate; silicon carbide; zeolites; pyrophyllite. Also possible are other families of sulphates, carbonates, silicates, oxides and vanadates.

Other examples of paint constituents are additives including thickening agents, wetting and dispersing agents. Examples of suitable thickening agents are bentonite, fumed/colloidal silica, natural thickeners (e.g. alginates), cellulosic thickeners, saccharides, and polysaccharides. Examples of wetting and dispersing agents that could be added include ammonium salts of polyacrylic acid, cellulose, non-ionic surfactants, anionic surfactants, and cationic surfactants.

An accelerator may be added. Examples of accelerators include e.g. organo siliconates, alkaline borates, trimethyl borates, titanates, alcohols, colloidal silica, silanes, choline base, choline, chelates such as EDTA, iron oxide, red lead, sodium bisulphate, sodium bicarbonate, sodium dihydrogen phosphate, potassium chloride, potassium bromide, and sucrose, preferably organo siliconates such as sodium methyl siliconate, sodium ethyl siliconate, sodium propyl siliconate, potassium methyl siliconate, potassium ethyl siliconate, potassium propyl siliconate, etc.

In one embodiment, the present invention relates to a protective coating comprising a water-based alkali metal silicate-based binder system, zinc particles, hollow glass microspheres, and a conductive pigment selected from the group consisting of graphite, carbon black, aluminium pigments, black iron oxide, antimony-doped tin oxide, indium tin oxide, mica coated with antimony-doped tin oxide, carbon nanotubes, and carbon fibres.

Because of the high reactivity of metallic zinc with water, the final mixing of the components is preferably done immediately before the application of the coating onto the steel material.

Colloidal Silicate Coatings

The silicate-based binder system may also, as its main silicate component contain colloidal silica particles as described in WO 02/22746.

An example of a suitable commercially available colloidal silicate is:
Ludox HS40, ex. Grace Division (US)

Preparation of the Zinc-Containing Silicate-Based Coating Composition

The zinc-containing silicate coating composition of the invention is typically prepared by mixing the silicate-based binder system, typically including already the microspheres and conductive pigment, with zinc and any other relevant constituents shortly before use thereof. The constituents are typically prepared beforehand as two (or more) components (pre-mixtures), which can readily be mixed in situ so as to obtain the ready-to-use composition.

The Zinc Particles

The material referred to as "zinc particles" is a particulate material with a high content of zinc, such as at least 90% by weight of zinc.

The term "particulate material" is intended to cover both fine spherical or somewhat irregularly shaped particles and other shapes such as flakes, discs, spheres, needles, platelets, fibres and rods. The particulate material may be a powder or a dust.

The particle size distribution of the particulate material is of some importance in painting applications. For example too coarse particulate materials would result in particles sticking through the dry paint film. Therefore, in one embodiment, particulate materials with a $D_{50}$ (mean particle size) of less than 50 µm is used. In a further embodiment, a $D_{50}$ of less than 20 µm is used, in yet a further embodiment, a $D_{50}$ of less than 15 µm is used, and in a still further embodiment a $D_{50}$ of less than 12 µm is used.

In addition to the remarks above, particles coarser than 100 µm should be avoided as much as possible, as they may stick out of the paint film. This would lead to defects in the paint film and deteriorate the barrier effect and the anti-corrosion properties. Therefore it is useful to discard, e.g. by sieving, any particles larger than 100 µm. In practice, a $D_{99}$ of less than 100 µm is deemed to be adequate The particle size distribution of the materials may e.g. be measured using a Helos® Sympatec GmbH laser diffraction apparatus. The parameters $D_{50}$ and $D_{99}$ are equivalent particle diameters for which the volume cumulative distribution, Q3, assumes values of respectively 50 and 99%.

The particulate materials can be manufactured by classic gas atomization of a corresponding coarse zinc material. As the particulate materials directly obtained from such a process still include coarse particles, which are incompatible with the envisaged application, a sieving or a classifying operation has to be performed.

The zinc particles comprised in the present invention may also be directly obtained commercially. Suppliers include Purity Zinc Metals, Horsehead Corporation, Umicore, US Zinc, Jiashan Baiwei, and Garrison Minerals, among many others, e.g. ZMP 4P16 or ZMP 4P645, Umicore (Belgium).

The zinc particles are in one embodiment present in the coating composition of the present invention in an amount of about 15 to 75% by solids volume, such as in the amount of about 18 to 70% by solids volume, e.g. in the amount of about 15 to 55% by solids volume, especially in the amount of about 20 to 45% by solids volume, e.g. in the amount of about 20 to 40% by solids volume, more particularly in the amount of about 20 to about 36% by solids volume, such as in the amount of about 25 to 35% by solids volume of the mixed coating composition. In another embodiment, the zinc particles are present in the coating composition of the present invention in an amount of about 50 to 75% by solids volume, such as in the amount of 60 to 70% by solids volume, e.g. in the amount of about 65 to 69% by solids volume of the mixed coating composition.

Hollow Glass Microspheres

Non-coated hollow glass microspheres may be purchased commercially. Suppliers include 3M Corporation, Minerals i Derivats S.A., and Potter Industries.

Potter Industries sells their hollow glass microspheres under the trademark SPHERICEL®. SPHERICEL® are available in various sizes, entitled 110P8, 60P18, 45P25, 34P30, and 25P45. The 110P8 microspheres are slightly heavier than water (in terms of specific gravity) and have a true density of 1.1 g/ml, whereas the densities of 60P18, 45P25, 34P30, and 25P45 are 0.60, 0.45, 0.34, and 0.25 g/ml, respectively. They have a maximum working pressure of 10,000, 8,000, 4,000, 3,000, and 750 psi, respectively.

The microspheres supplied by Minerals i Derivats S.A. (produced by Larand Chem Corp, US) under the name ESFERIGLASS-U6 are spherical, white, ultra low density glass spheres with a true density of 0.224 g/cc, a bulk density of 0.16 g/cc and an oil absorption of 38 g/100 cc. The particle size of these microspheres are such that 10% are smaller than 15 µm, 50% are smaller than 25 µm, and 90% are smaller than 40 µm.

Coated hollow glass microspheres may be prepared from the non-coated hollow glass microspheres according to the method disclosed in U.S. Pat. No. 4,621,024. However, in a presently preferred embodiment of the invention, the hollow glass microspheres comprised in the coating composition of the invention are non-coated.

The density of the hollow glass microspheres may influence the performance of the coating composition. Thus, in a presently preferred embodiment, the true density of the hollow glass microspheres is about 0.05 to 0.75, e.g. 0.1 to 0.5, such as about 0.2 to 0.4 g/cc, e.g. about 0.25 to 0.3 g/cc.

In a further embodiment of the coating composition of the present invention the hollow glass microspheres are non-coated and have a true density of about 0.05 to 0.75, e.g. 0.1 to 0.5, such as about 0.2 to 0.4 g/cc, e.g. about 0.25 to 0.3 g/cc.

In yet a further embodiment of the coating composition of the present invention the hollow glass microspheres have a particle size such that 90% have a diameter of less than 100 µm, such as less than 60 µm, e.g. less than 50 µm, more particularly less than 40 µm.

In still a further embodiment of the coating composition of the present invention the hollow glass microspheres have a particle size such that the $D_{50}$ diameter is in the range of about 20 to 200 µm, such as in the range of about 25 to 150 µm, e.g. in the range of about 50 to 100 µm. By the term "$D_{50}$ diameter" is understood that 50% of the particles have a diameter of less than the $D_{50}$ diameter.

The hollow glass microspheres are present in the coating composition of the present invention in an amount suitable to achieve improved corrosion resistance. Thus, in one embodiment, the hollow glass microspheres are present in an amount of between about 1 and 80% by solids volume of the mixed paint composition, such as between 15 and 70% by solids volume, e.g. between 25 and 70% by solids volume, more particularly between 40 and 65% by solids volume, such as between 50 and 65% by solids volume. In a further embodiment, the hollow glass microspheres are present in an amount of between about 1.5 and 20% by solids volume of the mixed paint composition. In another embodiment, the hollow glass microspheres are non-coated and are present in an amount of between about 1 and 80% by solids volume of the mixed paint composition, such as between 15 and 70% by solids volume, e.g. between 25 and 70% by solids volume, more particularly between 40 and 65% by solids volume, such as between 50 and 65% by solids volume. In yet another embodiment, the hollow glass microspheres are non-coated, are present in an amount of between about and 70% by solids volume, e.g. between 25 and 70% by solids volume, more particularly between 40 and 65% by solids volume, such as between 50 and 65% by solids volume, and the $D_{50}$ diameter is in the range of about 20 to 200 µm, such as in the range of about 25 to 150 µm, e.g. in the range of about 50 to 100 µm.

More specifically, in this further embodiment the hollow glass microspheres are non-coated, are present in an amount of between about 15 and 70% by solids volume, and the $D_{50}$ diameter is in the range of about 20 to 200 µm; the hollow glass microspheres are non-coated, are present in an amount of between about and 70% by solids volume, and the $D_{50}$ diameter is in the range of about 25 to 150 µm; the hollow glass microspheres are non-coated, are present in an amount of between about 15 and 70% by solids volume, and the $D_{50}$ diameter is in the range of about 50 to 100 µm; the hollow glass microspheres are non-coated, are present in an amount of between about 25 and 70% by solids volume, and the $D_{50}$ diameter is in the range of about 20 to 200 µm; the hollow glass microspheres are non-coated, are present in an amount of between about 25 and 70% by solids volume, and the $D_{50}$ diameter is in the range of about 25 to 150 µm; the hollow glass microspheres are non-coated, are present in an amount of between about and 25% by solids volume, and the $D_{50}$ diameter is in the range of about 50 to 100 µm; the hollow glass microspheres are non-coated, are present in an amount of between about 40 and 65% by solids volume, and the $D_{50}$ diameter is in the range of about 20 to 200 µm; the hollow glass microspheres are non-coated, are present in an amount of between about 40 and 65% by solids volume, and the $D_{50}$ diameter is in the range of about 25 to 150 µm; the hollow glass microspheres are non-coated, are present in an amount of between about 40 and 65% by solids volume, and the $D_{50}$ diameter is in the range of about 50 to 100 µm; the hollow glass microspheres are non-coated, are present in an amount of between about 50 and 65% by solids volume, and the $D_{50}$ diameter is in the range of about 20 to 200 µm; the hollow glass microspheres are non-coated, are present in an amount of between about 50 and 65% by solids volume, and the $D_{50}$ diameter is in the range of about 25 to 150 µm; or the hollow glass microspheres are non-coated, are present in an amount of between about 50 and 65% by solids volume, and the $D_{50}$ diameter is in the range of about 50 to 100 µm.

In a further embodiment, the hollow glass microspheres are present in an amount of less than 5.9% by weight of the composition, such as less than 5.5% by weight, e.g. in the range 0.1 to 5.0% by weight, 0.2 to 4.5% by weight, 0.5 to 4.0% by weight, or 1.0 to 3.0% by weight of the composition.

In a presently preferred embodiment the hollow glass microspheres are not added to the remaining components until after any final grinding.

Conductive Pigments

The conductive pigment comprised in the coating composition of the present invention may be selected from the group consisting of graphite, carbon black, aluminium pigments, black iron oxide, antimony-doped tin oxide, mica coated with antimony-doped tin oxide, carbon nanotubes, carbon fibres, and any mixture thereof. In one embodiment, the conductive pigment is selected from graphite, carbon black, aluminium pigments, antimony-doped tin oxide, carbon nanotubes, carbon black, and any mixture thereof. In a further embodiment, the conductive pigment is selected from graphite, carbon black, carbon nanotubes and any mixture thereof. In another embodiment, the conductive pigment is graphite. In yet another embodiment, the conductive pigment is carbon black.

In the context of the present invention, when referring to "graphite", the term is used in the sense that it may still be recognized by the skilled person as graphite per se and not as somehow being incorporated into other materials, in particular zinc, by chemical bonding or otherwise.

In the coating composition of the present invention, the conductive pigment, such as graphite or carbon black, is in one embodiment present in an amount of between about 0.1 to 50% by solids volume, such as about 1 to 40% by solids volume, e.g. about 1.5 to 30% by solids volume, more particularly about 2 to 20% by solids volume, such as about 3 to 10% by solids volume, e.g. about 3.5 to 8% by solids volume, more specifically about 4 to 6% by solids volume of the coating composition.

In a further embodiment, the coating composition of the invention comprises graphite in an amount of less than 4% by weight of the total composition, such as about 0.1 to 3.8% by weight of the total compositions, e.g. 0.5 to 3.5% by weight of the total composition.

The conductive pigments comprised in the present invention may be directly obtained commercially.

Examples of suitable conductive pigments are:
Graphit AF96/97 Graphitwerk Kropfmühl AG—Germany (graphite)
Cond 8/96, Graphite Týn, spol, s.r.o.—Czech Republic (micronized graphite)
DonaCarbo 5-241, Osaka Gas Chemicals Co, Ltd—Japan (carbon fibre)
Minatec 40 cm, Merck KGaA—Germany (mica coated with antimony-doped tin oxide
Raven 1000, ex. Columbian Carbon—USA (carbon black)
Carbon black Powercarbon 4300F, ex. Yongfeng Chemicals—China
Lamp Black 103, ex. Degussa AG—Germany (carbon black)
Special Black 100, ex. Orion Engineered Carbons GmbH—Germany (carbon black)

Kit of Parts

As mentioned above, the coating composition of the invention may contain two or more separated components. The skilled person will recognize that the zinc particles may advantageously be mixed with the remaining components of the coating composition in situ shortly before being applied. Said remaining components of the coating composition are often referred to as the "base component" and in the context of the present invention the term "base component" is intended to mean the components of the coating composition other than the zinc particles.

Hence, another aspect of the invention concerns a kit of parts containing a coating composition as defined herein comprising two or more containers, wherein one container contains the zinc particles and another container contains the base component.

The components of the coating composition of the invention as defined herein other than the silicate-based binder system and zinc particles may be contained in either of the two containers of the kit of parts or, possibly, in one or more further containers. Typically, said components will be present in the container containing said base component. Thus, in one embodiment, the components of the coating composition of the invention other than the zinc particles are contained in the container containing the base component.

Specific Embodiments

For each of the components a), b), c), and d) as disclosed herein for the paint composition of the invention a number of specific embodiments have been disclosed. It is seriously contemplated to combine each of said specific embodiments for component a) with each of said specific embodiments for component b), each of said specific embodiments for component c), and each of said specific embodiments for component d).

More specifically, one embodiment of the invention concerns a coating composition comprising:
a) a silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 25 to 150 μm, and
d) graphite.

Another embodiment of the invention concerns a coating composition comprising:
a) a silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 50 to 100 μm, and
d) graphite.

Still another embodiment of the invention concerns a coating composition comprising:
a) a silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 25 to 150 μm, and
d) graphite.

Yet another embodiment of the invention concerns a coating composition comprising:
a) a silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 50 to 100 μm, and
d) graphite.

Still another embodiment of the invention concerns a coating composition comprising:
a) a silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 25 to 150 μm, and
d) graphite.

Yet another embodiment of the invention concerns a coating composition comprising:
a) a silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 50 to 100 μm, and
d) graphite.

An additional embodiment of the invention concerns a coating composition comprising:
a) a silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 25 to 150 μm, and
d) carbon black.

A further embodiment of the invention concerns a coating composition comprising:
a) a silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 50 to 100 μm, and
d) carbon black.

Still a further embodiment of the invention concerns a coating composition comprising:
a) a silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 25 to 150 μm, and
d) carbon black.

Yet a further embodiment of the invention concerns a coating composition comprising:
a) a silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 50 to 100 μm, and
d) carbon black.

Still a further embodiment of the invention concerns a coating composition comprising:
a) a silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 25 to 150 μm, and
d) carbon black.

Yet a further embodiment of the invention concerns a coating composition comprising:
a) a silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 50 to 100 μm, and
d) carbon black.

One embodiment of the invention concerns a coating composition comprising:
a) a silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 25 to 150 μm, and
d) graphite.

Another embodiment of the invention concerns a coating composition comprising:
a) a silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 50 to 100 µm, and
d) graphite.

Still another embodiment of the invention concerns a coating composition comprising:
a) a silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 25 to 150 µm, and
d) graphite.

Yet another embodiment of the invention concerns a coating composition comprising:
a) a silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 50 to 100 µm, and
d) graphite.

Still another embodiment of the invention concerns a coating composition comprising:
a) a silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 25 to 150 µm, and
d) graphite.

Yet another embodiment of the invention concerns a coating composition comprising:
a) a silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 50 to 100 µm, and
d) graphite.

An additional embodiment of the invention concerns a coating composition comprising:
a) a silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 25 to 150 µm, and
d) carbon black.

A further embodiment of the invention concerns a coating composition comprising:
a) a silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 50 to 100 µm, and
d) carbon black.

Still a further embodiment of the invention concerns a coating composition comprising:
a) a silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 25 to 150 µm, and
d) carbon black.

Yet a further embodiment of the invention concerns a coating composition comprising:
a) a silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 50 to 100 µm, and
d) carbon black.

Still a further embodiment of the invention concerns a coating composition comprising:
a) a silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 25 to 150 µm, and
d) carbon black.

Yet a further embodiment of the invention concerns a coating composition comprising:
a) a silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 50 to 100 µm, and
d) carbon black.

As discussed above, a typical silicate-based binder system is the solvent-based alkyl silicate-based binder systems. Hence, one embodiment of the invention concerns a coating composition comprising:
a) an alkyl silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 25 to 150 µm, and
d) graphite.

Another embodiment of the invention concerns a coating composition comprising:
a) an alkyl silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 50 to 100 µm, and
d) graphite.

Still another embodiment of the invention concerns a coating composition comprising:
a) an alkyl silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 25 to 150 µm, and
d) graphite.

Yet another embodiment of the invention concerns a coating composition comprising:
a) an alkyl silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 50 to 100 μm, and
d) graphite.

Still another embodiment of the invention concerns a coating composition comprising:
a) an alkyl silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 25 to 150 μm, and
d) graphite.

Yet another embodiment of the invention concerns a coating composition comprising:
a) an alkyl silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 50 to 100 μm, and
d) graphite.

An additional embodiment of the invention concerns a coating composition comprising:
a) an alkyl silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 25 to 150 μm, and
d) carbon black.

A further embodiment of the invention concerns a coating composition comprising:
a) an alkyl silicate-based binder system,
b) zinc particles in an amount of about 20 to 45% by solids volume,
c) non-coated hollow glass microspheres in an amount of between about 40 and 65% by solids volume, and the $D_{50}$ diameter is in the range of about 50 to 100 μm, and
d) carbon black.

Still a further embodiment of the invention concerns a coating composition comprising:
a) an alkyl silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 25 to 150 μm, and
d) carbon black.

Yet a further embodiment of the invention concerns a coating composition comprising:
a) an alkyl silicate-based binder system,
b) zinc particles in an amount of about 20 to 45% by solids volume,
c) non-coated hollow glass microspheres in an amount of between about 50 and 65% by solids volume, and the $D_{50}$ diameter is in the range of about 50 to 100 μm, and
d) carbon black.

Still a further embodiment of the invention concerns a coating composition comprising:
a) an alkyl silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 25 to 150 μm, and
d) carbon black.

Yet a further embodiment of the invention concerns a coating composition comprising:
a) an alkyl silicate-based binder system,
b) zinc particles in an amount of about 20 to 45% by solids volume,
c) non-coated hollow glass microspheres in an amount of between about 1.5 and 20% by solids volume, and the $D_{50}$ diameter is in the range of about 50 to 100 μm, and
d) carbon black.

One embodiment of the invention concerns a coating composition comprising:
a) an alkyl silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 25 to 150 μm, and
d) graphite.

Another embodiment of the invention concerns a coating composition comprising:
a) an alkyl silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 50 to 100 μm, and
d) graphite.

Still another embodiment of the invention concerns a coating composition comprising:
a) an alkyl silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 25 to 150 μm, and
d) graphite.

Yet another embodiment of the invention concerns a coating composition comprising:
a) an alkyl silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 50 to 100 μm, and
d) graphite.

Still another embodiment of the invention concerns a coating composition comprising:
a) an alkyl silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 25 to 150 μm, and
d) graphite.

Yet another embodiment of the invention concerns a coating composition comprising:
a) an alkyl silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 50 to 100 μm, and
d) graphite.

An additional embodiment of the invention concerns a coating composition comprising:
a) an alkyl silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 25 to 150 μm, and
d) carbon black.

A further embodiment of the invention concerns a coating composition comprising:
a) an alkyl silicate-based binder system,
b) zinc particles in an amount of about 25 to 35% by solids volume,
c) non-coated hollow glass microspheres in an amount of between about 40 and 65% by solids volume, and the $D_{50}$ diameter is in the range of about 50 to 100 μm, and
d) carbon black.

Still a further embodiment of the invention concerns a coating composition comprising:
a) an alkyl silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 25 to 150 μm, and
d) carbon black.

Yet a further embodiment of the invention concerns a coating composition comprising:
a) an alkyl silicate-based binder system,
b) zinc particles in an amount of about 25 to 35% by solids volume,
c) non-coated hollow glass microspheres in an amount of between about 50 and 65% by solids volume, and the $D_{50}$ diameter is in the range of about 50 to 100 μm, and
d) carbon black.

Still a further embodiment of the invention concerns a coating composition comprising:
a) an alkyl silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 25 to 150 μm, and
d) carbon black.

Yet a further embodiment of the invention concerns a coating composition comprising:
a) an alkyl silicate-based binder system,
b) zinc particles in an amount of about 60 to 70% by solids volume,
c) non-coated hollow glass microspheres in an amount of between about 1.5 and 20% by solids volume, and the $D_{50}$ diameter is in the range of about 50 to 100 μm, and
d) carbon black.

Coating Systems

The term "applying" is used in its normal meaning within the paint industry. Thus, "applying" is conducted by means of any conventional means, e.g. by brush, by roller, by air-less spraying, by air-spray, by dipping, etc. The commercially most interesting way of "applying" the coating composition is by spraying. Spraying is effected by means of conventional spraying equipment known to the person skilled in the art. The coating is typically applied in a dry film thickness of 5-300 μm, such as 25-300 μm or 5-125 μm.

The coating composition of the invention may be applied as a single coating. Hence, in one embodiment, the coating composition of the invention is applied as a single coating. In a particular embodiment of the invention, an outer coating composition is subsequently applied onto said zinc-containing coat. The outer coating is typically of a coating composition selected from epoxy-based coating compositions, polyurethane-based coating compositions, acrylic-based coating compositions, polyurea-based coating composition, polysiloxane-based coating compositions and fluoro polymer-based coating compositions. Moreover, the outer coating is typically applied in a dry film thickness of 30-300 μm, such as 40-200 μm or 50-150 μm.

In a particular variant hereof, an intermediate coating composition is first subsequently applied onto said zinc-containing coat, whereafter the outer coating is applied onto the intermediate coating. The intermediate coating is typically of a coating composition selected from epoxy-based coating compositions, acrylic-based coating compositions, and polyurethane-based coating compositions. Moreover, the intermediate coating is typically applied in a dry film thickness of 50-200 μm.

Hence, the present invention also provides a coated structure comprising a metal structure having a coating of the coating composition of the invention applied onto at least a part of the metal structure. The present invention also provides a method of coating a metal structure, comprising the steps of applying to at least a part of the structure thereof a layer of a coating composition according to the invention.

Furthermore, the present invention also provides a coated structure comprising a metal structure having a first coating of the zinc-containing coating composition defined herein applied onto at least a part of the metal structure in a dry film thickness of 5-300 μm, such as 25-300 μm; and an outer coating applied onto said zinc-containing coating in a dry film thickness of 30-300 μm, such as 30-200 μm. Preferably, the outer coating is of a coating composition selected from epoxy-based coating compositions, polyurethane-based coating compositions, acrylic-based coating compositions, polyurea-based coating composition, polysiloxane-based coating compositions and fluoro polymer-based coating compositions.

In an interesting variant hereof, an intermediate coating has been applied onto said zinc-containing coating in a dry film thickness of 50-200 μm before application of the outer coating composition. Preferably, the intermediate coating is of a coating composition selected from epoxy-based coating compositions, acrylic-based coating compositions, and polyurethane-based coating compositions.

The metal structure is typically selected from bridges, containers, refineries, petrochemical industry, power-plants, storage tanks, cranes, windmills, steel structures part of civil structures e.g. airports, stadia and tall buildings, or fixed or floating offshore equipment, e.g. for the oil and gas industry such as oil rigs.

The structure is of a metal, in particular steel.

Preparation of the Paint Composition

The paint may be prepared by any suitable technique that is commonly used within the field of paint production. Thus, the various constituents may be mixed together using a high speed disperser, a ball mill, a pearl mill, a three-roll mill etc.

The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration.

Typically, the solid components of the paint composition are mixed and ground. However, the hollow glass microspheres are advantageously not included until after the grinding has taken place. Thus, in one embodiment, the hollow glass microspheres are included in the paint composition of the invention after any grinding of the remaining paint components. In a further embodiment, the invention comprises a paint composition obtainable by including the hollow glass microspheres after any grinding of the remaining paint components.

The paint composition may be prepared as a one component paint or by mixing two or more components e.g. two pre-mixtures, one pre-mixture comprising the based component and one pre-mixture comprising the zinc particles. Or as a three component system where one pre-mixture comprises the base component, one pre-mixture comprises the zinc particles and a third container comprises any additional component(s).

The hollow glass microspheres and the conductive pigment may be added, together or separately, to any of the components in a paint composition prepared from two or more components. They are, however, preferably added to the silicate-based binder system.

It should be understood that when reference is made to the coating composition, it is the mixed coating composition ready to be applied. Furthermore all amounts stated as % by solids volume of the paint should be understood as % by solids volume of the mixed coating composition unless stated otherwise.

Examples

Test Methods
Mud-Crack Test (MCT) & Accelerator Test (ACT)

Apply a coat on a steel panel, e.g. size 200×300 mm, with increasing film thickness with steps of 30-40 µm ranging from specified film thickness of the standard system up to 5 times the specified film thickness. Place the panels at 70-80% RH, 20-25° C. When the coat is completely cured, there must be no visual mud-cracking when looking through a magnifying glass with 10 times magnification.

Pull-Off Test (POT)

Pull-off test according to ISO 4624 (ASTM D 4541), with P.A.T hydraulic adhesion tester. This test covers the determination of the pull-off strength of a coating or coating system, by determining the greatest perpendicular force (in tension) that a surface area can bear, before a plug of material is detached. Failure will occur along the weakest plane within the system comprised of the test fixture, adhesive coating system and substrate.

After the panels have been coated and conditioned, a steel pin doll with a surface area of 1.58 cm$^2$ is glued onto the paint surface on the test panel (150×200×15 mm) with Standard Araldite glue and cured for 24 hours.

After curing of the glue, the paint film is cut free around the dolls down to the substrate and the dolls are pulled off using the P.A.T hydraulic adhesion tester. The pull-off value (tensile strength) is noted, and converted in relation to the area of the doll and stated in MPa.

Salt Spray Test (SST)

Salt spray test according to ASTM B 117 (ISO 7253). Test for evaluation corrosion resistance in salt spray or reproducing corrosion that occurs in atmosphere containing salt spray or splash. Constant spray with 5% NaCl solution at 35° C. When the test is stopped, blisters and rust are evaluated according to ASTM D 714 (ISO 4628-2) and ASTM D 610 (ISO 4628-3) respectively. Adhesion is evaluated according to knife adhesion test.

Chemical Resistance Test (CRT)

Chemical resistance test (CRT), partly according to ISO 2812-1974 (method 1) is a method for determining the resistance of a single-coat film or a multi-coat of paints or related products to the action of liquids. The panels are exposed to the liquid with inspection after 7 days, 1 month and final evaluation after 2 months. The panels are half immersed and subject to storage temperatures of 23° C. After exposure, the panels are dried and both the immersed and non-immersed areas are tested according to ASTM D 4752 as follows:

The method describes a solvent rub technique for assessing the MEK (methyl ethyl ketone) resistance of ethyl silicate (inorganic) zinc-rich primers. The dry film thickness of the coating in a selected area is measured. The coating is rubbed with MEK 50 times using a cloth. The dry film thickness in the rubbed area is measured after rubbing. The resistance is evaluated on a scale from 5 (no effect on surface after rubbing) to 0 (penetration to the substrate after rubbing). Results from the immersed part are reported as wet resistance and the non-immersed area as dry resistance.

Immersion (IMS)

This test is performed in order to provoke possible weak adhesion in a system, applied on a panel half immersed in fresh water.

The panel is applied and cured before the immersion. Half the panel is immersed in fresh water and half the panel is exposed to the water vapour. No water-stirring and ambient temperature. The exposure period is 14 days. When the test is stopped, the panels are immediately examined for blisters according to ASTM D 714 (ISO 4628-2) and adhesion is evaluated according to the knife adhesion test.

Knife Adhesion Test (ADH)

Knife adhesion test is used to evaluate the adhesion of a paint system to the substrate and between coats (layers).

The test is done by making two intersecting scratches through the paint film to the substrate with a sharp steel knife. Adhesive or cohesive failures are evaluated by peeling the coating from the intersection point and outwards.

The test is performed on both immersed and non-immersed panel-halves (referred to as respectively "wet" and "dry" adhesion). The type of rupture is reported, and the severity is judged on a scale from 5 (perfect) to 0 (poor).

Cohesion Test—(Coin Test)

This test is performed in order to check the cohesion and hardness of the dry film by means of scratching with a coin.

Apply a uniform layer in an uncoated panel with a surface preparation (minimum) roughness according to Rugotest no 3 BN9b in a steel panel 150×75×3 mm. After the panels have been coated and conditioned* (it is necessary to define the drying conditions of humidity low (50/70%) or high (>70%)). After (approximately) 24 hours of drying, the dry film thickness of the coating in a selected area is measured. Scratch the surface with a coin in an angle between 40-60°. After the scratch, check the dust in the surface, and evaluate according to the table below.

Scratch
1—Soft film very easy to reach metal
2—Fragile film, reaches the metal
3—Light soft, fragile
4—Slip resistance, almost hard
5—Hard film, good slip Dust
1—Low quantity/a little dust
2—Medium level of dust
3—Too much dust Preparation of Test Panels Steel panels are coated with 1×70 µm of the paint to be tested. The steel panels (10×15 cm×1.6 mm) are cold rolled mild steel, abrasive blasted to Sa 2½ (ISO 8501-1), with a surface profile equivalent to BN 9 (Rugotest No. 3). After the samples have been coated the panels are conditioned at a temperature of 23±2° C. and 50±5% relative humidity for a period of 7 days.

Preparation of Coating Compositions

Component 1:

Ethyl-silicate, 1-methoxy-2-propanol, and isopropyl alcohol was mixed in a suitable can and the hydrochloric acid solution was added slowly under agitation for 1 hour.

The intermediate base (xylene, pre-hydrolysed ethyl silicate, and additives) was pre-mixed on a Diaf dissolver equipped with an impeller disc (70 mm in diameter) in a 4 liter can for 15 minutes at 1000 rpm. Pigments/fillers (type and amounts as indicated in Tables 1 and 2) were added to the mixture and grinding was performed for 15 minutes at 2000 rpm.

The remaining 1-methoxy-2-propanol and the glycol ether solvent and aromatic hydrocarbon solvent were added and the composition was mixed at 1000 rpm for 5 minutes.

The glass microspheres were added at low speed and mixed at 1000 rpm for 5 minutes. The zinc chloride catalyst solution was added and the composition was mixed for 5 minutes at 1000 rpm.

Component 2:

Just before application, HEMPEL's ZINC METAL PIGMENT 97170 (component 2) was added to component 1. HEMPEL's ZINC METAL PIGMENT 97170 was slowly poured down into component 1 with constant mechanical stirring until the mixture was free of lumps.

TABLE 1

Model paints according to the invention with graphite

| | Model Paint 1 | Reference Paint | | | | | Model Paint 2 |
|---|---|---|---|---|---|---|---|
| | 1 % SV | 2 % SV | 3 % SV | 4 % SV | 5 % SV | % SV | % SV |
| Xylene, aromatic hydrocarbon solvent | | | | | | | |
| Organo clay (Luvogel SA1, Lehmann & Voss, Germany) | 1.3 | 1.3 | 1.3 | 1.3 | 1.3 | 1.3 | 1.3 |
| Wetting and suspending agent | <1 | <1 | <1 | <1 | <1 | <1 | <1 |
| PM, Propyleneglycol monomethyl ether, glycol ether solvent | | | | | | | |
| Isopropanol, alcohol solvent | | | | | | | |
| Ethylsilicate 40, silicate binder (Silicat TES 40WN, Wacker Chemie, Germany) | 8.2 | 8.2 | 8.2 | 8.2 | 8.2 | 8.2 | 8.2 |
| Water | | | | | | | |
| Hydrochloric acid | | | | | | | |
| Silica aerogel, hydrophobic type (Aerosil R 972, Evonik Ind., Germany) | 0.7 | 0.7 | 0.7 | 0.7 | 0.7 | 0.7 | 0.7 |
| Kaolin, aluminium silicate, extender pigment (Polwhite E powder, Imerys Min) | 21.2 | | | | 10.7 | 10.5 | |
| Medium-boiling aromatic hydrocarbon solvent | | | | | | | |
| Anhydrous zinc chloride | 0.3 | 0.3 | 0.3 | 0.3 | 0.3 | 0.3 | 0.3 |
| Zinc dust, metallic pigment (ZMP 4P645, Umicore, Belgium) | 67.4 | 67.4 | 67.4 | 67.4 | 67.4 | 67.4 | 67.4 |
| Lightweight hollow glass spheres (Esteriglass U6, Minerals I Derivats, S.A, Spain) | | 10.5 | 21.2 | | 10.5 | | 19.3 |
| Macrocrystalline graphite, heat resisting and anti-static pigment (Graphit AF96/97, Graphitwerk Kropfmühl, Germany) | | 10.7 | | 21.2 | | 10.7 | 1.9 |
| Total | 100 | 100 | 100 | 100 | 100 | 100 | 100 |
| SVR, % | 38.1 | 38.1 | 38.1 | 38.1 | 38.1 | 38.1 | 38.1 |

| | Model Paint 3 | Reference Paint 4 | | 5 | 6 |
|---|---|---|---|---|---|
| | % SV | 6 % SV | 7 % SV | % SV | % SV |
| Xylene, aromatic hydrocarbon solvent | | | | | |
| Organo clay (Luvogel SA1, Lehmann & Voss, Germany) | 1.3 | 0.9 | 1.0 | 1.0 | 0.7 | 1.2 |
| Wetting and suspending agent | <1 | 0.7 | 0.8 | 0.8 | 0.5 | 0.9 |
| PM, Propyleneglycol monomethyl ether, glycol ether solvent | | | | | |
| Isopropanol, alcohol solvent | | | | | |

TABLE 1-continued

| Model paints according to the invention with graphite | | | | | | |
|---|---|---|---|---|---|---|
| Ethylsilicate 40, silicate binder (Silicat TES 40WN, Wacker Chemie, Germany) | 8.2 | 5.5 | 6.5 | 6.6 | 4.5 | 7.4 |
| Water | | | | | | |
| Hydrochloric acid | | | | | | |
| Silica aerogel, hydrophobic type (Aerosil R 972, Evonik Ind., Germany) | 0.7 | 0.5 | 0.6 | 0.6 | 0.4 | 0.6 |
| Kaolin, aluminium silicate, extender pigment (Polwhite E powder, Imerys Min, UK) | | | | | 10.7 | |
| Medium-boiling aromatic hydrocarbon solvent | | | | | | |
| Anhydrous zinc chloride | 0.3 | 0.2 | 0.2 | 0.2 | 0.2 | 0.3 |
| Zinc dust, metallic pigment (ZMP 4P645, Umicore, Belgium) | 67.3 | 24.8 | 62.3 | 43.5 | 30.3 | 30.1 |
| Lightweight hollow glass spheres (Esteriglass U6, Minerals I Derivats, S.A, Spain) | 1.9 | 67.4 | | 34.1 | 57.7 | 47.6 |
| Macrocrystalline graphite, heat resisting and anti-static pigment (Graphit AF96/97, Graphitwerk Kropfmühl, Germany) | 19.3 | | 28.2 | 13.1 | 5.8 | 11.9 |
| Total | 100 | 100 | 100 | 100 | 100 | 100 |
| SVR, % | 38.1 | 47.7 | 43.6 | 43.2 | 52.9 | 42.0 |

| | Model Paint | | Reference Paint | | |
|---|---|---|---|---|---|
| | 7 | 8 | | | |
| | 8 % SV | 9 % SV | 9 % SV | % SV | 10 % SV |
| Xylene, aromatic hydrocarbon solvent | | | | | |
| Organo clay (Luvogel SA1, Lehmann & Voss, Germany) | 1.2 | 0.6 | 1.2 | 0.5 | 1.4 |
| Wetting and suspending agent | 0.9 | 0.4 | 0.9 | 0.4 | 1.1 |
| PM, Propyleneglycol monomethyl ether, glycol ether solvent | | | | | |
| Isopropanol, alcohol solvent | | | | | |
| Ethylsilicate 40, silicate binder (Silicat TES 40WN, Wacker Chemie, Germany) | 7.4 | 22.0 | 7.4 | 19.0 | 9.0 |
| Water | | | | | |
| Hydrochloric acid | | | | | |
| Silica aerogel, hydrophobic type (Aerosil R 972, Evonik Ind., Germany) | 0.6 | 1.3 | 0.6 | 0.8 | 0.8 |
| Kaolin, aluminium silicate, extender pigment (Polwhite E powder, Imerys Min, UK) | | | | | |
| Medium-boiling aromatic hydrocarbon solvent | | | | | |
| Anhydrous zinc chloride | 0.3 | 0.8 | 0.3 | 0.7 | 0.3 |
| Zinc dust, metallic pigment (ZMP 4P645, Umicore, Belgium) | 30.1 | 30.1 | 30.1 | 30.2 | 48.6 |
| Lightweight hollow glass spheres (Esteriglass U6, Minerals I Derivats, S.A, Spain) | 59.5 | | 54.1 | 4.4 | |
| Macrocrystalline graphite, heat resisting and anti-static pigment (Graphit AF96/97, Graphitwerk Kropfmühl, Germany) | | 44.8 | 5.4 | 44.0 | 38.8 |
| Total | 100 | 100 | 100 | 100 | 100 |
| SVR, % | 42.0 | 27.2 | 42.0 | 30.2 | |

All model paints and references have a PVC/cPVC ratio above 1.2.

TABLE 2

Model paints according to the invention with carbon black

| | Model Paint 9 | 10 | 11 | 12 | 13 |
|---|---|---|---|---|---|
| | % SV | % SV | % SV | % SV | % SV |
| Xylene, aromatic hydrocarbon solvent | | | | | |
| Organo clay (Luvogel SA1, Lehmann & Voss, Germany) | 1.3 | 1.3 | 0.3 | 0.3 | 1.2 |
| Wetting and suspending agent | 1.0 | 1.0 | 0.2 | 0.3 | 0.9 |
| PM, Propyleneglycol monomethyl ether, glycol ether solvent | | | | | |
| Isopropanol, alcohol solvent | | | | | |
| Ethylsilicate 40, silicate binder (Silicat TES 40WN, Wacker Chemie, Germany) | 8.2 | 8.2 | 14.4 | 10.9 | 7.4 |
| Water | | | | | |
| Hydrochloric acid | | | | | |
| Silica aerogel, hydrophobic type (Aerosil R 972, Evonik Ind., Germany) | 0.7 | 0.7 | 0.2 | 1.0 | 0.6 |
| Kaolin, aluminium silicate, extender pigment (Polwhite E powder, Imerys Min, UK) | | | | | |
| Medium-boiling aromatic hydrocarbon solvent | | | | | |
| Anhydrous zinc chloride | 0.3 | 0.3 | 0.5 | 0.4 | 0.3 |
| Zinc dust, metallic pigment (ZMP 4P645, Umicore, Belgium) | 67.4 | 67.4 | 45.2 | 38.4 | 30.1 |
| Lightweight hollow glass spheres (Esteriglass U6, Minerals I Derivats, S.A, Spain) | 15.7 | 19.3 | 32.7 | 44.3 | 52.0 |
| Carbon Black, low to medium colour furnace (Special Black 100, Orion Engineered Carbons GmbH, Germany) | 5.4 | 1.9 | 6.5 | 4.4 | 7.4 |
| Total | 100 | 100 | 100 | 100 | 100 |
| SVR, % | 38.1 | 38.1 | 36.8 | 40.1 | 42.0 |

All model paints and references have a PVC/cPVC ratio above 1.2.

Test Results

The results of the Salt Spray Test (SST) are provided below in Table 3 for Model paints 1 to 13 and for Reference paints 1 to 10.

TABLE 3

| | Results of SST after 750 h | |
|---|---|---|
| Paint Composition | panel 1 | panel 2 |
| Model paint 1 | Ri0 | Ri0 |
| Model paint 2 | Ri1 | Ri1 |
| Model paint 3 | Ri0 | Ri0 |
| Model paint 4 | Ri0 | Ri1 |
| Model paint 5 | Ri1 | Ri1 |
| Model paint 6 | Ri1 | Ri1 |
| Model paint 7 | Ri1 | Ri1 |
| Model paint 8 | Ri0 | Ri0 |
| Model paint 9 | Ri0 | Ri0 |
| Model paint 10 | Ri0 | Ri0 |
| Model paint 11 | Ri0 | Ri0 |
| Model paint 12 | Ri1 | Ri0 |
| Model paint 13 | Ri0 | Ri0 |
| Reference paint 1 | Ri2 | Ri2 |
| Reference paint 2 | Ri0 | Ri0 |
| Reference paint 3 | Ri0 | Ri0 |
| Reference paint 4 | Ri0 | Ri1 |
| Reference paint 5 | Ri1 | Ri1 |
| Reference paint 6 | Ri1 | Ri0 |
| Reference paint 7 | Ri0 | Ri1 |
| Reference paint 8 | Ri1 | Ri1 |
| Reference paint 9 | Ri1 | Ri1 |
| Reference paint 10 | Ri0 | Ri0 |

Results of SST are evaluated by an aspect scale, going from $R_i0$=very good, to $R_i5$=very bad.

The results of the Mud-crack test (MCT) are provided below in Table 4 for Model paints 1 to 13 and Reference paints 1 to 10:

TABLE 4

| | Mud-cracking | |
|---|---|---|
| | No mud-cracking observed at film thickness of | Visual mud-cracking observed at film thickness of |
| Paint Composition | μm | μm |
| Model paint 1 | 150 | 200 |
| Model paint 2 | 210 | 260 |
| Model paint 3 | 190 | 220 |
| Model paint 4 | 210 | 230 |
| Model paint 5 | 185 | 265 |
| Model paint 6 | 240 | 270 |
| Model paint 7 | 220 | 270 |
| Model paint 8 | 140 | 170 |
| Model paint 9 | 180 | 230 |
| Model paint 10 | 180 | 200 |
| Model paint 11 | 90 | 110 |
| Model paint 12 | 100 | 140 |
| Model paint 13 | 180 | 230 |
| Reference paint 1 | 150 | 190 |
| Reference paint 2 | 160 | 220 |
| Reference paint 3 | 180 | 240 |
| Reference paint 4 | 240 | 260 |
| Reference paint 5 | 140 | 180 |
| Reference paint 6 | 180 | 210 |
| Reference paint 7 | 220 | 280 |
| Reference paint 8 | 150 | 170 |
| Reference paint 9 | 120 | 180 |
| Reference paint 10 | — | — |

The results of the Cohesion test are provided below in Table 5 for Model paints 1 to 13 and Reference paints 1 to 10:

TABLE 5

| Cohesion test | Drying - 24 h | | | | | |
|---|---|---|---|---|---|---|
| | 50% Hr, 23° C. | | | 50-100% Hr, ambient conditions, | | |
| | Av. thickness | Coin test | | Av. thickness | Coin test | |
| | μm | Cohesion | Dust | μm | Cohesion | Dust |
| Model paint 1 | 62 | — | 1 | 74 | 4-5 | 2 |
| Model paint 2 | 52 | 4-5 | — | 52 | 5 | 1 |
| Model paint 3 | 92 | 5 | 1 | 84 | 5 | 1 |
| Model paint 4 | — | 4 | 3 | 86 | 5 | — |
| Model paint 5 | 100 | 2 | 3 | 128 | 2-3 | 3 |
| Model paint 6 | 76 | 5 | — | 89 | 3-4 | 3 |
| Model paint 7 | 69 | 5 | — | 79 | 4-5 | 1 |
| Model paint 8 | 88 | 4-5 | — | 95 | 4-5 | 1 |
| Model paint 9 | 59 | 2-3 | — | 63 | 4-5 | — |
| Model paint 10 | 78 | 3-4 | — | 74 | 4-5 | — |
| Model paint 11 | — | 5 | 1 | 58 | 5 | 1 |
| Model paint 12 | 54 | — | — | — | — | — |
| Model paint 13 | 83 | 3-4 | — | 85 | 3-4 | 3 |
| Reference paint 1 | 74 | 3 | — | 73 | 2-3 | — |
| Reference paint 2 | 62 | 2 | 3 | 62 | 3-4 | 3 |
| Reference paint 3 | 92 | 3-4 | 3 | 84 | 4-5 | — |
| Reference paint 4 | 105 | 1-2 | 3 | — | 3-4 | 2 |
| Reference paint 5 | 120 | 2-3 | 3 | 115 | 4 | 2 |
| Reference paint 6 | — | — | — | — | 5 | — |
| Reference paint 7 | — | 4 | 3 | — | 4 | 3 |
| Reference paint 8 | 66 | 2-3 | — | 66 | 2-3 | — |
| Reference paint 9 | 86 | 5 | — | 85 | 5 | — |
| Reference paint 10 | — | 3 | 3 | 99 | 4 | 3 |

The invention claimed is:

1. An anti-corrosive zinc primer coating composition comprising:
   a) an alkali metal silicate binder system or an alkyl silicate binder system wherein the alkyl silicate binder system includes one or more alkyl silicate resins selected from the group consisting of ethyl silicates and other alkyl silicates wherein the alkyl groups contain from 1 to 8 carbon atoms,
   b) zinc particles,
   c) a thickening agent,
   d) uncoated hollow glass microspheres, and
   e) a conductive pigment selected from the group consisting of graphite, carbon black, aluminium pigments, black iron oxide, antimony-doped tin oxide, mica coated with antimony-doped tin oxide, carbon nanotubes, carbon fibres, and any mixture thereof,
   wherein said silicate-based binder system is solvent-based or water-based, and wherein all uncoated hollow glass microspheres have a particle size such that the $D_{50}$ diameter over the combined pool of all uncoated hollow glass microspheres is in the range of about 20 to 200 μm.

2. The coating composition according to claim 1, wherein the silicate-based binder system is solvent-based.

3. The coating composition according to claim 1, wherein the silicate-based binder system is water-based.

4. The coating composition according to claim 1, wherein the conductive pigment is selected from the group consisting of carbon black, carbon nanotubes, graphite, and any mixture thereof.

5. The coating composition according to claim 4, wherein the conductive pigment is graphite.

6. The coating composition according to claim 4, wherein the conductive pigment is carbon black.

7. The coating composition according to claim 1, wherein the conductive pigment is present in an amount of between about 0.1 to 50% by solids volume of the coating composition.

8. The coating composition according to claim 1, wherein the uncoated hollow glass microspheres are present in an amount of between about 1 and 80% by solids volume of the mixed paint composition.

9. The coating composition according to claim 1, wherein all uncoated hollow glass microspheres have a particle size such that the $D_{50}$ diameter over the combined pool of all uncoated hollow glass microspheres is in the range of about 50 to 100 μm.

10. A kit of parts containing a coating composition as defined in claim 1 comprising two or more containers, wherein one container contains the zinc particles and one or more containers contain the silicate-based binder system, the uncoated hollow glass microspheres, and the conductive pigment selected from the group consisting of graphite, carbon black, aluminium pigments, black iron oxide, antimony-doped tin oxide, mica coated with antimony-doped tin oxide, carbon nanotubes, carbon fibres, and any mixture thereof.

11. The kit of parts according to claim 10 comprising two containers, wherein one container contains the zinc particles and another container contains the silicate-based binder system, the uncoated hollow glass microspheres, and the conductive pigment selected from the group consisting of graphite, carbon black, aluminium pigments, black iron oxide, antimony-doped tin oxide, mica coated with antimony-doped tin oxide, carbon nanotubes, carbon fibres, and any mixture thereof.

12. A coated structure comprising a metal structure having a coating of the coating composition defined in claim 1 applied onto at least a part of the metal structure.

13. A method of coating a metal structure, comprising the step of applying to at least a part of said metal structure thereof a layer of a coating composition as defined in claim 1.

* * * * *